United States Patent [19]
Benham et al.

[11] Patent Number: 6,166,152
[45] Date of Patent: Dec. 26, 2000

[54] PROCESS TO PRODUCE LOW DENSITY POLYMER IN A LOOP REACTOR

[75] Inventors: Elizabeth A. Benham, Bartlesville, Okla.; Carleton E. Stouffer, Houston, Tex.; Jose M. Dionisio, Bartlesville, Okla.; Steven J. Secora, Bartlesville, Okla.; John N. DeGood, III, Bartlesville, Okla.; Robert W. Bohmer, Houston; Michael C. Carter, League City, both of Tex.

[73] Assignee: Phillips Petroleum Company, Bartlesville, Okla.

[21] Appl. No.: 09/031,416

[22] Filed: Feb. 26, 1998

[51] Int. Cl.[7] .................................. C08F 2/04; C08F 4/52
[52] U.S. Cl. .............................. 526/64; 526/75; 526/114; 526/118; 526/129; 526/160; 526/943; 526/113; 526/904; 526/119; 526/126; 526/127; 526/130; 502/113; 502/117
[58] Field of Search .............................. 526/64, 75, 114, 526/118, 129, 160, 943, 113, 904, 119, 126, 127, 130; 502/113, 117

[56] References Cited

U.S. PATENT DOCUMENTS

| | | | |
|---|---|---|---|
| 5,498,581 | 3/1996 | Welch et al. | 502/102 |
| 5,663,236 | 9/1997 | Takahashi et al. | 525/240 |
| 5,700,749 | 12/1997 | Tsutsui et al. | 502/117 |
| 5,710,224 | 1/1998 | Alt et al. | 526/160 |
| 5,739,225 | 4/1998 | Tazaki et al. | 526/127 |
| 5,854,363 | 12/1998 | Jung et al. | 526/160 |
| 5,863,853 | 1/1999 | Vaughan et al. | 502/108 |
| 5,874,513 | 2/1999 | Watanabe et al. | 526/348.1 |

FOREIGN PATENT DOCUMENTS

| | | | |
|---|---|---|---|
| 0524624A2 | 1/1993 | European Pat. Off. | C07F 17/00 |
| 0571882A2 | 1/1993 | European Pat. Off. | C08F 10/00 |
| 0602509A2 | 6/1994 | European Pat. Off. | C08F 4/62 |
| 0668295A1 | 8/1995 | European Pat. Off. | C08F 2/44 |
| 0685495A1 | 12/1995 | European Pat. Off. | C08F 10/00 |
| WO 92/15619 | 9/1992 | WIPO | C08F 2/38 |
| WO 96/34895 | 11/1996 | WIPO | C08F 2/06 |
| WO96/34895 | 11/1996 | WIPO . | |
| WO 97/24375 | 7/1997 | WIPO | C08F 2/14 |

*Primary Examiner*—David W. Wu
*Assistant Examiner*—R. Rabago
*Attorney, Agent, or Firm*—Carl D. Corvin; Edward L. Bowman

[57] ABSTRACT

A method for producing a low density copolymer of ethylene and 1-hexene having a density in the range of about 0.915 to about 0.930 grams/cc in a continuous loop reactor under slurry phase reactor conditions in the presence of a liquid diluent comprising (a) using a prepolymerized solid particulate metallocene catalyst system, (b) combining the catalyst system with a liquid diluent, and (c) agitating the mixture of (b) to form a liquid mixture containing catalyst system particles that are substantially uniform in size, (d) passing this liquid mixture into the loop reactor, (e) not adding any hydrogen, (f) employing the temperature in the range of about 170° F. to about 180° F., (g) employing ethylene in an amount equal to about 5 to about 6 weight % of the liquid diluent and the loop reactor, and (h) employing 1-hexene in an amount equal to about 1.5 to about 2.5 weight % of the liquid diluent in the loop reactor.

25 Claims, No Drawings

PROCESS TO PRODUCE LOW DENSITY POLYMER IN A LOOP REACTOR

FIELD OF THE INVENTION

This invention is related to the field of methods that polymerize monomers into polymers, wherein said monomers comprise ethylene and 1-hexene, and wherein said polymers are linear, low density, polyethylenes.

BACKGROUND OF THE INVENTION

The term "Metallocene" as used herein refers to a derivative of cyclopentadienylidene which is a metal derivative containing at least one cyclopentadienyl component which is bonded to a transition metal. The transition metal is selected from Groups IVB, VB, and VIB, preferably IVB and VIB. Examples include titanium, zirconium, hafnium, chromium, and vanadium. A number of metallocenes have been found to be useful for the polymerization of olefins. Generally, the more preferred catalysts are metallocenes of Zr, Hf, or Ti.

Generally, in order to obtain the highest activity from metallocene catalysts, it has been necessary to use them with an organoaluminoxane cocatalyst, such as methylaluminoxane. This resulting catalyst system is generally referred to as a homogenous catalyst system since at least part of the metallocene or the organoaluminoxane is in solution in the polymerization media. These homogenous catalyst systems have the disadvantage that when they are used under slurry polymerization conditions, they produce polymer which sticks to reactor walls during the polymerization method and/or polymer having small particle size and low bulk density which limits the commercial utility.

Some attempts to overcome the disadvantages of the homogenous metallocene catalyst systems are disclosed in U.S. Pat. Nos. 5,240,894, 4,871,705; and 5,106,804. Typically, these procedures have involved the prepolymerization of the metallocene aluminoxane catalyst system either in the presence of or in the absence of a support. An evaluation of these techniques has revealed that there is still room for improvement, particularly when the catalyst is one which is to be used in a slurry type polymerization where the object is to produce a slurry of insoluble particles of the end product polymer rather than a solution of polymer which could result in fouling of the reactor. In the operation of a slurry polymerization in a continuous loop reactor it is extremely important for efficient operations to limit polymer fouling of the internal surfaces of the reactor. The term "fouling" as used herein refers to polymer buildup on the surfaces inside the reactor.

Slurry polymerization conducted in a loop reactor (also know as "slurry process") has been generally regarded as being excellent for producing high density resins, but also as being incapable of efficiently producing low density resins, due to, in part, the swelling of the polymer during its production. Using butene as a comonomer helps to produce low density resins, but such resins have poor properties. Thus, slurry polymerization in a loop reactor has been generally omitted from the market for low density resins.

Using metallocene catalysts, under slurry polymerization conditions, and in a loop reactor has presented problems. In general, metallocene catalysts feed very poorly to the reactor. They also have a tendency to produce polymer fines. They also have a tendency of causing irreversible plate-out on the reactor walls leading to loss of heat transfer and eventual reactor shut-down. This plate-out is quite difficult to clean off the reactor walls. The polymerization activity of these metallocene catalysts have often been lower than other catalysts used. Additionally, their activity can be erratic, and can vary with the density of resin produced. Runaways and petering out (the opposite problem) are both quite common with metallocene catalysts. Worst, the catalyst has a bad tendency to produce hard large chunks of polymer of around 0.5 cm diameter, or larger, which causes problems with polymer recovery. These catalysts also have an unusual characteristic of gassing off the reactor (i.e., forming bubbles) even at ethylene levels where this is not supposed to happen based on previous experience with other catalysts. They are extremely sensitive to hydrogen because a small amount can send the melt index off target very easily.

Therefore, the inventors provide this invention to help solve these problems.

SUMMARY OF THE INVENTION

In accordance with the present invention a method is provided. Said method comprises polymerizing monomers with a solid metallocene-containing catalyst system. In addition, said polymer is provided.

The phrase "liquid catalyst system" as used herein refers to the combination of an aluminoxane, a metallocene, and a liquid, irrespective of whether the aluminoxane and/or the metallocene are dissolved in the liquid.

DETAILED DESCRIPTION OF THE INVENTION

A wide range of metallocenes are considered to be applicable to the present method. In an preferred embodiment, an essential feature is that the metallocene be one wherein at least one cyclopentadienyl-type ligand has a substituent having a polymerizable olefinic group. Some examples of such olefin-containing metallocenes are disclosed in U.S. Pat. No. 5,169,818 and published European Application No. 574,370. The invention is considered applicable to both bridged and unbridged metallocenes. The unbridged metallocenes can even include bridged ligands which contain two cyclopentadienyl-type radicals connected by a suitable bridging structure but wherein only one of the cyclopentadienyl-type radicals of that ligand is bonded to the transition metal. Alternatively the olefinic substituent can be on the bridge connecting the two cyclopentadienyl-type groups.

The metallocenes of the type contemplated as useful for the present invention include those represented by the formula $R_x(Z)(Z)MeQ_k$ wherein each Z bound to Me and is the same or different and is a cyclopentadienyl-type ligand selected from substituted or unsubstituted cyclopentadienyl, indenyl, tetrahydroindenyl, octahydrofluorenyl, and fluorenyl ligands; R is a structural bridge linking the Z's and Me is a metal selected from the group consisting of IVB, VB, and VIB metals of the periodic table, each Q is the same or different and is selected from the group consisting of hydrogen, halogens, and organoradicals; x is 1 or 0; k is a number sufficient to fill out the remaining valences of Me; further characterized by the fact that it has at least one olefinically unsaturated substituent attached. In bridged metallocenes this olefinically unsaturated substituent can be a branch on the bridging unit or on one or both of the cyclopentadienyl-type groups of the bridged ligands.

A particularly preferred type of bridged metallocene includes those in which the olefinically unsaturated substituent has the formula

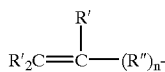

wherein R" is a hydrocarbyl diradical having 1 to 20 carbon atoms; more preferably 2 to 10; n is 1 or 0, and each R' is individually selected from the group consisting of organo radicals having 1 to 10 carbon atoms and hydrogen. Most preferably R" has at least two carbons in its main alkylene chain, i.e. it is a divalent ethylene radical or a higher homolog thereof.

Some olefinic branched bridged ligands useful for making metallocenes suitable for the present invention can be prepared by reacting a dihalo olefinic compound with an alkali metal salt of a suitable cyclopentadiene-type compound to produce a compound of the formula Z—R—Z where R is a bridge having olefinic unsaturation and wherein each Z is the same or alternatively to first produce a compound of the formula Z—R—X wherein X is a halogen and then reacting that compound with an alkali metal salt of another different cyclopentadiene-type compound to produce a compound of the formula Z—R—Z wherein the two Z's differ. Such reactions can be carried out using conditions of the type disclosed in U.S. Pat. No. 5,191,132.

An alternate technique for forming an olefinic branched bridged ligand involves reacting a carbonyl compound having olefinic unsaturation with a cyclopentadiene-type compound in the presence of a base and methanol to yield an alkenyl fulvene which is then reacted with an alkali metal salt of a cyclopentadiene-type compound, such as, for example, fluorene, to yield the unsaturated-branched-bridged ligand containing two cyclopentadienyl-type groups, i.e. fluorenyl and cyclopentadienyl. For example, one could react 5-hexene-2-one with cyclopentadiene using a procedure like that disclosed by Stone et al in *J. Org. Chem.*, 49, 1849 (1984) to yield 6-(but-3-enyl)-6-methylfulvene which could then be reacted with fluorenyl-lithium and subsequently hydrolyzed to yield 5-cyclopentadienyl-5-(9-fluorenyl)-1-hexene, also sometimes referred to as 1-(9-fluorenyl)-1-(cyclopentadienyl)-1-(methyl)-1-(but-3-enyl) methane.

The bridged metallocenes that can be used in this invention are prepared from vinyl terminated branched bridged ligands of the formula

1)

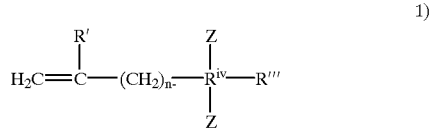

wherein n is a number typically in the range of about 0 to 20; more preferably 2–10; $R^{iv}$ is Si, Ge, C, or Sn; R''' and R' are each individually selected from hydrogen, or organo groups having 1 to 10 carbons. Currently preferred R' and R''' components are hydrogen or alkyl groups typically having 1 to 10 carbon atoms, or aryl groups typically having 6 to 10 carbon atoms. Z is a cyclopentadienyl-type radical as described earlier.

The metallocenes of such olefinically unsaturated branched-bridged ligands can be prepared by reacting the olefinically branched-bridged bis(cyclopentadienyl-type) ligand with an alkali metal alkyl to produce a divalent ligand salt that is then reacted with the transition metal compound to yield the metallocene, using the techniques generally known in the art for forming such metallocenes. See, for example, the technique disclosed in European Published Application 524,624, the disclosure of which is incorporated herein by reference. Some typical examples of some metallocenes containing a substituent having olefinic unsaturation include 5-(cyclopentadienyl)-5-(9-fluorenyl)-1-hexene zirconium dichloride,
bis(9-fluorenyl)(methyl)(vinyl)silane zirconium dichloride,
bis(9-fluorenyl)(methyl)(prop-2-enyl)silane zirconium dichloride,
bis(9-fluorenyl)(methyl)(but-3-enyl)silane zirconium dichloride,
bis(9-fluorenyl)(methyl)(hex-5-enyl) silane zirconium dichloride,
bis(9-fluorenyl)(methyl)(oct-7-enyl)silane zirconium dichloride,
(cyclopentadienyl)(1-allylindenyl) zirconium dichloride,
bis(1-allylindenyl) zirconium dichloride,
(9-(prop-2-enyl) fluorenyl) (cyclopentadienyl) zirconium dichloride,
(9-(prop-2-enyl) fluorenyl)(pentamethylcyclopentadienyl) zirconium dichloride,
bis(9-(prop-2-enyl)fluorenyl) zirconium dichloride,
(9-(cyclopent-2-enyl) fluorenyl) (cyclopentadienyl) zirconium dichloride,
bis(9-(cyclopent-2-enyl) (fluorenyl)zirconium dichloride,
5-(2-methylcyclopentadienyl)-5-(9-fluorenyl)-1-hexene zirconium dichloride,
5-(fluorenyl)-5-(cyclopentadienyl)-1-hexene hafnium dichloride,
(9-fluorenyl)(1-allylindenyl)dimethylsilane zirconium dichloride,
1-(2,7-di(alpha-methylvinyl)(9-fluorenyl))-1-(cyclopentadienyl)-1,1-dimethylmethane zirconium dichloride,
1-(2,7-di(cyclohex-1-enyl)(9-fluorenyl))-1-(cyclopentadienyl)-1,1-methane zirconium dichloride,
5-(cyclopentadienyl)-5-(9-fluorenyl)-1-hexene titanium dichloride, and the like.

These various metallocenes can be prepared by reacting the necessary cyclopentadienyl-type alkali metal salt with a transition metal compound. Some examples of such reactions are disclosed in the aforementioned published EPC application no. 524,624.

Examples of metallocene preparation methods are disclosed in U.S. Pat. No. 5,498,581 the disclosure of which is hereby incorporated by reference.

The organo aluminoxane component used in preparing the solid catalyst system is an oligomeric aluminum compound having repeating units of the formula

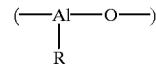

Some examples are often represented by the general formula $(R-Al-O)_n$ or $R(R-Al-O-)_n AlR^2$. In the general aluminoxane formula R is a $C_1-C_5$ alkyl radical, for example, methyl, ethyl, propyl, butyl or pentyl and "n" is an integer from 1 to about 50. Most preferably, R is methyl and "n" is at least 4. Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally the reaction of an aluminum alkyl with a limited amount of water is postulated to yield a mixture of the linear and cyclic species of the aluminoxane.

The metallocene and aluminoxane are combined in the presence of a suitable liquid to form a liquid catalyst system. It is preferred that the liquid catalyst system be prepared using an organic liquid in which the aluminoxane is at least partially soluble. The currently preferred liquids are hydrocarbons such as hexane or toluene. Typically some aromatic liquid solvent is employed. Examples include benzene, toluene, ethylbenzene, diethylbenzene, and the like. The amount of liquid to be employed is not particularly critical. Nevertheless, the amount should preferably be such as to dissolve the product of the reaction between the metallocene and the aluminoxane, provide desirable polymerization viscosity for the prepolymerization, and to permit good mixing. The temperature is preferably kept below that which would cause the metallocene to decompose. Typically the temperature would be in the range of −50° C. to 100° C. Preferably, the metallocene, the aluminoxane, and the liquid diluent are combined at room temperature, i.e. around 10 to 30° C. The reaction between the aluminoxane and the metallocene is relatively rapid. The reaction rate can vary depending upon the ligands of the metallocene. It is generally desired that they be contacted for at least about a minute to about 1 hour.

The liquid catalyst system can be formed in the presence of a particulate solid. Any number of particulate solids can be employed as the particulate solid. Typically the support can be any organic or inorganic solid that does not interfere with the desired end result. Examples include porous supports such as talc, inorganic oxides, and resinous support materials such as particulate polyolefins. Examples of inorganic oxide materials include Groups II, III, IV or V metal oxides such as silica, alumina, silica-alumina, and mixtures thereof. Other examples of inorganic oxides are magnesia, titania, zirconia, and the like. Other suitable support materials which can be employed include such as, magnesium dichloride, and finely divided polyolefins, such as polyethylene. A mixture of one or more of the particulate solids can also be used.

It is generally desirable for the solid to be thoroughly dehydrated prior to use, preferably it is dehydrated so as to contain less than 1% loss on ignition. Thermal dehydration treatment may be carried out in vacuum or while purging with a dry inert gas such as nitrogen at a temperature of about 20° C. to about 1000° C., and preferably, from about 300° C. to about 800° C. Pressure considerations are not critical. The duration of thermal treatment can be from about 1 to about 24 hours. However, shorter or longer times can be employed provided equilibrium is established with the surface hydroxyl groups.

Dehydration can also be accomplished by subjecting the solid to a chemical treatment in order to remove water and reduce the concentration of surface hydroxyl groups. Chemical treatment is generally capable of converting all water and hydroxyl groups in the oxide surface to relatively inert species. Useful chemical agents are for example, trimethylaluminum, ethyl magnesium chloride, chlorosilanes such as $SiCl_4$, disilazane, trimethylchlorosilane, dimethylaminotrimethylsilane and the like.

The chemical dehydration can be accomplished by slurrying the inorganic particulate material such as, for example silica, in an inert low boiling hydrocarbon, such as for example, hexane. During the chemical dehydration treatment, the silica should be maintained in a moisture and oxygen free atmosphere. To the silica slurry is then added a low boiling inert hydrocarbon solution of the chemical dehydrating agent, such as, for example dichloroldimethylsilane. The solution is added slowly to the slurry. The temperature ranges during chemical dehydration reaction can be from about 20° C. to about 120° C., however, higher and lower temperatures can be employed. Preferably, the temperature will be about 50° C. to about 100° C. The chemical dehydration procedure should be allowed to proceed until all the substantially reactive groups are removed from the particulate support material as indicated by cessation of gas evolution. Normally, the chemical dehydration reaction will be allowed to proceed from about 30 minutes to about 16 hours, preferably, 1 to 5 hours. Upon completion of the chemical dehydration, the solid particulate material may be filtered under a nitrogen atmosphere and washed one or more times with a dry, oxygen free inert solvent. The wash solvents as well as the diluents employed to form the slurry and the solution of chemical dehydrating agent, can be any suitable inert hydrocarbon. Illustrative of such hydrocarbons are pentane, heptane, hexane, toluene, isopentane and the like.

Another chemical treatment that can be used on solid inorganic oxides such as silica involves reduction by contacting the solid with carbon monoxide at an elevated temperature sufficient to convert substantially all the water and hydroxyl groups to relatively inactive species.

The specific particle size of the support or inorganic oxide, surface area, pore volume, and number of hydroxyl groups is not considered critical to its utility in the practice of this invention. However, such characteristics often determine the amount of support to be employed in preparing the catalyst compositions, as well as affecting the particle morphology of polymers formed. The characteristics of the carrier or support must therefore be taken into consideration in choosing the same for use in the particular invention.

It is also possible to add such a particulate solid to the liquid catalyst system after it has been formed and to carry out the prepolymerization in the presence of that solid.

The amount of aluminoxane and metallocene used in forming the liquid catalyst system for the prepolymerization can vary over a wide range. Typically, however, the molar ratio of aluminum in the aluminoxane to transition metal of the metallocene is in the range of about 1:1 to about 20,000:1, more preferably, a molar ratio of about 50:1 to about 2000:1 is used. If a particulate solid, i.e. silica, is used generally it is used in an amount such that the weight ratio of the metallocene to the particulate solid is in the range of about 0.00001/1 to 1/1, more preferably 0.0005/1 to 0.2/1.

The prepolymerization is conducted in the liquid catalyst system, which can be a solution, a slurry, or a gel in a liquid. A wide range of olefins can be used for the prepolymerization. Typically, the prepolymerization will be conducted using an olefin, preferably selected from ethylene, propylene, and non-aromatic alpha-olefins. A mixture of olefins, such as, for example, ethylene and a higher alpha olefin can be used for the prepolymerization. The use of a higher alpha olefin, such as 1-butene, with ethylene is believed to increase the amount of copolymerization occurring between the olefin monomer and the olefinically unsaturated portion of the metallocene.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about −15° C. to about +110° C., more preferably in the range of about +10 to about +30° C. In another embodiment of this invention, it is preferred to conduct the prepolymerization by beginning at a temperature in the range of about −15° C. to about 10° C. and maintaining the temperature within 3° C. to 5° C. of the beginning temperature. The amount of prepolymer can be varied but typically would be in the range of from about 1 to about 95 wt % of the resulting prepolymerized solid catalyst system, more preferably about 5 to 80 wt %. It is generally desirable to carry out the prepolymerization to at least a point where substantially all of the metallocene is in the solid rather than in the liquid since that maximizes the use of the metallocene.

It is within the scope of the present invention for two different metallocenes to be present during the prepolymerization. In a preferred embodiment there are at least two different metallocenes each having at least one olefinically unsaturated substituant that are employed during the prepolymerization.

After the prepolymerization, the resulting solid prepolymerized catalyst is separated from the liquid of the reaction mixture. Various techniques known in the art can be used for carrying out this step. For example, the material could be separated by filtration, decantation, or by vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from the liquid, the resulting solid is preferably washed with a hydrocarbon and then dried using high vacuum to remove substantially all the liquids and other volatile components that might still be associated with the solid. The vacuum drying is preferably carried out under relatively mild conditions, i.e. temperatures below 100° C. More typically the prepolymerized solid is dried by subjection to a high vacuum at a temperature of about 30° C. until a substantially constant weight is achieved. A preferred technique employs at least one initial wash with an aromatic hydrocarbon, such as toluene, followed by a wash with a paraffinic hydrocarbon, such as hexane, and then vacuum drying.

Contact the prepolymerization reaction mixture product with a liquid in which the prepolymer is sparingly soluble, i.e. a counter solvent for the prepolymer, can help cause soluble prepolymer to precipitate from the solution. Such a liquid is also useful for the subsequent washing of the prepolymerized solid.

Adding a particulate solid of the type aforementioned after the prepolymerization can also be done. Thus one can add the solid to the liquid prepolymerization product before the counter solvent is added. In this manner soluble prepolymer tends to precipitate onto the surface of the solid to aid in the recovery of the filtrate in a particulate form and to prevent agglomeration during drying. The liquid mixture resulting from the prepolymerization or the solid prepolymerized catalyst can be subjected to sonification to help break up particles if desired.

Further, if desired, the recovered solid prepolymerized catalyst system can be screened to give particles having sizes that meet the particular needs for a particular type of polymerization.

Another option is to combine the recovered solid prepolymerized catalyst system with an inert hydrocarbon, such as one of the type used as a wash liquid, and then to remove that liquid using a vacuum. In such a method it is sometimes desirable to subject the resulting mixture to sonification before stripping off the liquid.

The resulting solid prepolymerized metallocene-containing catalyst system is useful for the polymerization of olefins. Generally, it is not necessary to add any additional aluminoxane to this catalyst system. In some cases it may be found desirable to employ small amounts of an organoaluminum compound as a scavenger for poisons. The term organoaluminum compounds include compounds such as triethylaluminum, trimethylaluminum, diethylaluminum chloride, ethylaluminum dichloride, ethylaluminum sesquichloride, and the like. Trialkyl aluminum compounds are currently preferred. Also in some applications it may be desirable to employ small amounts of antistatic agents which assist in preventing the agglomeration of polymer particles during polymerization. Still further, when the catalyst system is added to a reactor as a slurry in a liquid, it is sometimes desirable to add a particulate dried solid as a flow aid for the slurry. Preferably the solid has been dried using one of the methods described earlier. Inorganic oxides such as silica are particularly preferred. Currently, it is preferred to use a fumed silica such as that sold under the trade name Cab-o-sil. Generally the fumed silica is dried using heat and trimethylaluminum.

The solid catalyst system is particularly useful for the polymerization of alpha-olefins having 2 to 10 carbon atoms. Examples of such olefins include ethylene, propylene, butene-1, pentene-1,3-methylbutene-1, hexene-1,4-methylpentene-1,3 -methylpentene-1, heptene-1, octene-1, decene-1,4,4-dimethyl-1-pentene, 4,4-diethyl-1-hexene, 3,4-dimethyl-1-hexene, and the like and mixtures thereof. The catalysts are also useful for preparing copolymers of ethylene and propylene and copolymers of ethylene or propylene and a higher molecular weight olefin.

The polymerizations can be carried out under a wide range of conditions depending upon the particular metallocene employed and the particular results desired. Although the catalyst system is a solid, it is considered that it is useful for polymerization conducted under solution, slurry, or gas phase reaction conditions.

When the polymerizations are carried out in the presence of liquid diluents obviously it is important to use diluents which do not have an adverse effect upon the catalyst system. Typical diluents include propane, butane, isobutane, pentane, hexane, heptane, octane, cyclohexane, methylcyclohexane, toluene, xylene, and the like. Additionally, it should be noted that usually some olefins can be in the diluent. Typically, the polymerization temperature can vary over a wide range, temperatures typically would be in a range of about −60° C. to about 300° C., more preferably in the range of about 20° C. to about 160° C. Typically the pressure of the polymerization would be in the range of from about 1 to about 500 atmospheres or even greater. The catalyst system is particularly useful for polymerizations carried out under particle form, i.e., slurry-type polymerization conditions.

In the production of linear, low density polymers, it is currently preferred to polymerize ethylene with 1-hexene. This polymerization is conducted under slurry polymerization conditions. Furthermore, it is conducted in a loop reactor. The diluent comprises, in major part, isobutane. The polymerization temperature needs to be in the range of 170° F. to 185° F., preferably 175° F. to 180° F. At temperatures outside the range about 170° F. to about 185° F. the melt index of the resulting polymer is undesirable. The ethylene concentration in the reactor should be from about 4 to about 6 weight percent, preferably 5 to 6 weight percent, based on the weight of the diluent. Higher concentrations of ethylene tend to cause chunks of polymer to form inside the reactor which is undesirable. Lower concentrations can lower efficiency the polymerization process. Furthermore, the polymerization should be conducted in the substantial absence of hydrogen. This is because hydrogen greatly affects the polymer, resulting in a wide variation in the melt index of said polymer, which is undesirable. The amount of 1-hexene in the reactor should be from about 1.5 to about 2.5 weight percent. Amounts outside this range will produce polymers with undesirable densities. It is important that the catalyst be substantially uniform in size when fed to the reactor. One way of accomplishing this is by mixing the catalyst with some isobutane to form a mixture, and then agitating the mixture to form a more uniform mixture. This mixture is easier to pump in a more uniform manner to the reactor. If the catalyst is not substantially uniform in size it tends to feed poorly and it also tends to stick together into large chunks. These large catalyst chunks, when introduced to the reactor, tend make polymer that is also in large chunks, and then these large polymer chunks plug up the equipment. In general, the size of the catalyst particles should be less than 0.5 cm, but preferably larger than 10 micrometers. The results of this polymerization process are, in part, a linear, low density polymer having a density from 0.915 to 0.930, preferably, 0.916 to 0.922 g/cc, and having a melt index from about 0.2 to 1.8 g/10 min., preferably 0.8 to 1.8. This resin is particularly desirable for film applications.

The polymers produced with this invention have a wide range of uses that will be apparent to those skilled in the art from the physical properties of the respective polymers. Applications such as molding, films, adhesives, and the like are indicated.

A further understanding of the present invention, its various aspects, objects and advantages will be provided by the following examples.

The catalyst system used in the following examples was produced in accordance with U.S. Pat. No. 5,498,581 the entire disclosure of which is hereby incorporated by reference. The metallocene used was 1-(9-fluorenyl)-1-(cyclopentadienyl)-1-(but-3-enyl)-1-(methyl) methane. Also methylaluminoxane was used as the cocatalyst and silica was used as a support.

In example one, several samples were collected by polymerizing ethylene and 1-hexene, under slurry polymerization conditions, in a loop reactor, and in a diluent that comprised, in major part, isobutane. The polymerization temperature was 175° F. to 180° F. The pressure in this example, and the other examples, was in the range of 35 to 45 atmospheres. The ethylene concentration in the reactor was 5 to 6 weight percent. The 1-hexene concentration in the reactor was 1.5 to 2.5 weight percent. The polymer produced had a density from 0.916–0.920 g/cc and a melt index from 0.8 to 1.2 g/10 min. This example shows the operability of the invention for producing linear, low density polymer.

In example two, several samples were collected by polymerizing ethylene and 1-hexene, under slurry polymerization conditions, in a loop reactor, and in a diluent that comprised, in major part, isobutane. The polymerization temperature was 175° F. to 180° F. The ethylene concentration in the reactor was greater than 6.5 weight percent, this was different from example one. The 1-hexene concentration in the reactor was 1.5 to 2.5 weight percent. During polymerization the polymer particles produced in the reactor started to get too big due to, in part, the higher concentration of ethylene. These larger sized polymer particles started to plug the product take off valves which necessitated stopping the polymerization.

In example three, several samples were collected by polymerizing ethylene and 1-hexene, under slurry polymerization conditions, in a loop reactor, in a diluent that comprised, in major part, isobutane. The polymerization temperature was greater than 190° F. which was higher than the temperatures used in example one. The ethylene concentration in the reactor was 5 to 6 weight percent. The 1-hexene concentration in the reactor was 1.5 to 2.5 weight percent. The polymer produced had a density was to high (>0.930 g/cc). Additionally, the heat transfer ability of the reactor was substantially decreased which could have cause an eventual reactor fouling.

That which is claimed is:

1. A method comprising polymerizing monomers to produce a linear, low density polymer of ethylene and 1-hexene having a density in the range of about 0.915 to about 0.930 grams/cc in a continuous loop reactor under slurry phase reactor conditions in the presence of a liquid diluent comprising (a) using a prepolymerized solid particulate metallocene catalyst system, (b) combining the catalyst system with a liquid diluent, and (c) agitating the mixture of (b) to form a liquid mixture containing catalyst system particles that are substantially uniform in size, (d) passing this liquid mixture into the loop reactor, (e) not adding any hydrogen, (f) employing the temperature in the range of about 170° F. to about 180° F., (g) employing ethylene in an amount equal to about 5 to about 6 weight % of the liquid diluent and the loop reactor, and (h) employing 1-hexene in an amount equal to about 1.5 to about 2.5 weight % of the liquid diluent in the loop reactor, further characterized by the fact that the prepolymerized solid particulate metallocene catalyst system is prepared by the process comprising (a) combining in a liquid an organoaluminoxane and at least one metallocene having at least one cyclopentadienyl, indenyl, tetrahydroindenyl, octahydroindenyl, or fluorenyl ligand having at least one olefinically unsaturated substitutent to form a liquid catalyst system, (b) conducting prepolymerization of at least one olefin in the presence of said catalyst system to produce a prepolymerized solid catalyst containing no more than about 95 weight percent prepolymer, and (c) separating the resulting solid from the liquid and components dissolved in said liquid.

2. A method according to claim 1 wherein after the solid is separated from the liquid in step (c) the solid is subjected to drying to remove substantially all the liquid.

3. A method according to claim 2 wherein an aromatic solvent is used for forming the liquid catalyst system.

4. A method according to claim 3, wherein the solvent that is used for forming the liquid catalyst system is toluene.

5. A method according to claim 4, wherein a solid particulate support is added to the reaction product of step (b), then a liquid in which the prepolymer is sparingly soluble is added.

6. A method according to claim 5, wherein said particulate support is silica.

7. A method according to claim 6, wherein the solid is separated from the liquid in step (c) by filtering, then washing the recovered solid with a hydrocarbon, and then drying the washed solid.

8. A method according to claim 7, wherein an alkane is used in the washing.

9. A method according to claim 1 wherein step (a) is conducted in the presence of a particulate support that is insoluble in the liquid being employed in step (a).

10. A method according to claim 9 wherein said particulate support is an inorganic oxide.

11. A method according to claim 8, wherein the prepolymerization involves the prepolymerization of ethylene.

12. A method according to claim 11, wherein the prepolymerization involves the prepolymerization of a mixture of ethylene and 1-butene.

13. A method according to claim 1, wherein step (a) is conducted in the presence of a bridged metallocene having olefinic unsaturation in a branch extending outwardly from the bridge, the ligand of said metallocene having the formula

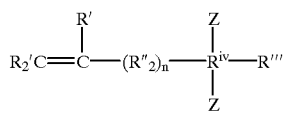

wherein n is 1 or 0; $R^{iv}$ is Si, Ge, C, or Sn; each R' is individually selected from the group consisting of hydrogen and hydrocarbyl radicals having 1 to 10 carbons; R" is selected from the group consisting of hydrocarbyl diradicals containing 1 to 10 carbons; R'" is selected from the group consisting of hydrogen and hydrocarbyl groups containing 1 to 10 carbons; and each Z is the same or different and is selected from the group consisting of substituted and unsubstituted cyclopentadienyl, indenyl, tetrahydroindenyl, and fluorenyl radicals.

14. A method according to claim 13, wherein 5-(9-fluorenyl)-5-(cyclopentadienyl)-hexene-1 zirconium dichloride is employed.

15. A method according to claim 1, wherein the metallocene is selected from the group consisting of
5-(cyclopentadienyl)-5-(9-fluorenyl)-1-hexene zirconium dichloride,
bis(9-fluorenyl)(methyl)(vinyl)silane zirconium dichloride,
bis(9-fluorenyl)(methyl)(prop-2-enyl)silane zirconium dichloride,
bis(9-fluorenyl)(methyl)(but-3-enyl)silane zirconium dichloride,
bis(9-fluorenyl)(methyl)(hex-5-enyl) silane zirconium dichloride,
bis(9-fluorenyl)(methyl)(oct-7-enyl)silane zirconium dichloride,
(cyclopentadienyl)(1-allylindenyl) zirconium dichloride,
bis(1-allylindenyl) zirconium dichloride,
(9-(prop-2-enyl) fluorenyl)(cyclopentadienyl) zirconium dichloride,
(9-(prop-2-enyl) fluorenyl)(pentamethylcyclopentadienyl) zirconium dichloride,
bis(9-(prop-2-enyl)fluorenyl) zirconium dichloride,
(9-(cyclopent-2-enyl)fluorenyl)(cyclopentadienyl) zirconium dichloride,
bis(9-(cyclopent-2-enyl)fluorenyl) zirconium dichloride,
5-(2-methylcyclopentadienyl)-5-(9-fluorenyl)-1-hexene zirconium dichloride,
5-(fluorenyl)-5-(cyclopentadienyl)-1-hexene hafnium dichloride,
(9-fluorenyl)(1-allylindenyl)dimethylsilane zirconium dichloride,
1-(2,7-di(alpha-methylvinyl)-(9-fluorenyl)-1-(cyclopentadienyl)-1,1-dimethylmethane zirconium dichloride, and
1-(2,7-di(cyclohex-1-enyl) 9-fluorenyl))-1-(cyclopentadienyl)-1,1-methane zirconium dichloride.

16. A method according to claim 1, wherein two different metallocenes are present during the prepolymerization.

17. A method according to claim 16, wherein at least two different metallocenes each having at least one olefinically unsaturated substituent are employed during the prepolymerization.

18. A method according to claim 17, wherein at least one of the metallocenes is 5-(fluorenyl)-5-(cyclopentadienyl)-hexene-1 zirconium dichloride.

19. A method according to claim 18, wherein at least two different bridged metallocenes are employed each having olefinic unsaturation in a branch extending outwardly from the bridge.

20. A method according to claim 1 wherein the solid metallocene-containing catalyst system used in the polymerization is prepared by
(a) combining 5-(9-fluorenyl)-5-(cyclopentadienyl)-hexene-1 zirconium dichloride and methylaluminoxane in a liquid,
(b) prepolymerizing ethylene in the resulting liquid, in the presence of silica, and
(c) separating the resulting solid from the liquid.

21. A method according to claim 20 wherein the liquid used in step (a) consists essentially of an aromatic liquid.

22. A method according to claim 1 wherein said temperature in the loop reactor is from 175° F. to about 180° F.

23. A method according to claim 1 wherein said polymer has a density from 0.916 to 0.922 g/cc.

24. A process according to claim 23 which produces a copolymer suitable for producing a film.

25. A process according to claim 1 which produces a copolymer suitable for producing a film.

* * * * *